United States Patent Office 3,632,640
Patented Jan. 4, 1972

3,632,640
NITRIC ACID REMOVAL FROM ORGANIC ACIDS
John C. Mayfield, Lake Jackson, Tex., assignor to The Dow Chemical Company, Midland, Mich.
No Drawing. Filed Aug. 30, 1967, Ser. No. 664,308
Int. Cl. C07c 59/04
U.S. Cl. 260—535 R                                    7 Claims

ABSTRACT OF THE DISCLOSURE

A method for removing nitric acid from organic acids, alone or in combination, which comprises adding a soluble alkaline earth metal compound to the acid mixture, and then removing the precipitated nitrate salt.

BACKGROUND OF THE INVENTION

In the production of various organic acids, nitric acid is a contaminant which it is necessary to remove.

The prior art, particularly U.S. Pat. No. 2,847,453, teaches removing nitric acid by distillation, which is inconvenient and time consuming. This method requires as much as 16 to 20 hours distillation time.

SUMMARY OF THE INVENTION

My invention is a method for removing nitric acid from an organic acid or a mixture of organic acids which comprises adding a soluble alkaline earth metal compound to the acid or mixture thereof, and removing, by filtering, centrifuging, or other well-known methods, the precipitated nitrate salt.

By alkaline earth metals I mean calcium, barium, strontium, and magnesium. The alkaline earth metal compound provides a source of cations for reaction with the nitrate values. Substantially any soluble alkaline earth metal cation source is suitable.

The preferred classes of alkaline earth metal cation sources are hydroxides, such as $Ba(OH)_2$, $Ca(OH)_2$ and $Mg(OH)_2$, carbonates, such as $BaCO_3$, $CaCO_3$ and $MgCO_3$; oxides, such as BaO, CaO and MgO; or peroxides, such as $BaO_2$, $CaO_2$ and $MgO_2$.

The recovered alkaline earth metal nitrates can be converted to the oxide or peroxide by firing them at a temperature of from about 592° C. to 800° C., and then fed back into the reaction as cation sources.

The method is operable for any organic acid in which the alkaline earth metal nitrate is insoluble, especially saturated fatty acids such as acetic acid, propionic acid, butyric acid and stearic acid; unsaturated fatty acids such as oleic acid and methacrylic acid; and hydroxyalkanoic acids such as α-hydroxyisobutyric acid, glycolic acid, lactic acid, and hydracrylic acid. A solid acid would also be subject to my process by merely dissolving it in an inert solvent.

Although the reaction takes place almost instantaneously, it is generally preferred to agitate the mixture for a few minutes or more to assure optimum contact between the nitrate values and the alkaline earth metal values.

This process is especially useful in the removal of nitric acid from the products in the manufacture of α-nitrato and α-hydroxyisobutyric acids as found in U.S. Pat. No. 2,847,453.

PREFERRED EMBODIMENTS

The following is an example of my invention, although it is in no way intended to limit same:

EXAMPLE I

To a suitable vessel containing 306.5 grams of a mixture comprising:

67.86% by weight of acetic acid (HOAc),
21.53% by weight α-hydroxyisobutyric acid (HiBA),
6.73% by weight nitric acid, and
3.88% by weight water was added 31.5 grams (11.81% excess of the calculated 27.78 grams required to precipitate 42.83 grams of barium nitrate) of barium peroxide. After stirring at 25° C. for about 4 hours, the precipitated barium nitrate was recovered by centrifuging. There was recovered 41.28 grams (96.38% of theoretical) barium nitrate. 96.33% of the HiBA and 92.68% of the HOAc originally present was recovered. The loss was mainly due to evaporation.

I claim:
1. A method for removing nitric acid from saturated or unsaturated fatty acids, or hydroxyalkanoic acids, or mixtures thereof which comprises adding a sufficient amount of a soluble alkaline earth metal cation source to said acids or mixtures thereof and then removing the precipitated nitrate salt.
2. The method of claim 1 wherein the alkaline earth metal source is a hydroxide.
3. The method of claim 1 wherein the alkaline earth metal source is a carbonate.
4. The method of claim 1 wherein the alkaline earth metal source is an oxide.
5. The method of claim 1 wherein the alkaline earth metal source is a peroxide.
6. The method of claim 1 wherein the alkaline earth metal source is barium peroxide.
7. The method of claim 1 wherein the mixture of acids is acetic acid and α-hydroxyisobutyric acid.

References Cited
UNITED STATES PATENTS
2,971,981    2/1961    Aries _____ 260—480 O LORRAINE A. WEINBERGER, Primary Examiner
P. J. KILLOS, Assistant Examiner U.S. Cl. X.R.
260—419, 526 N, 540, 541